US012682244B2

(12) United States Patent
Ramalho et al.

(10) Patent No.: US 12,682,244 B2
(45) Date of Patent: Jul. 14, 2026

(54) NEURAL NETWORK SYSTEMS IMPLEMENTING CONDITIONAL NEURAL PROCESSES FOR EFFICIENT LEARNING

(71) Applicant: GDM Holding LLC, Mountain View, CA (US)

(72) Inventors: Tiago Miguel Sargento Pires Ramalho, Tokyo (JP); Dan Rosenbaum, London (GB); Marta Garnelo Abellanas, London (GB); Christopher Maddison, Toronto (CA); Seyed Mohammadali Eslami, London (GB); Yee Whye Teh, Oxford (GB); Danilo Jimenez Rezende, London (GB)

(73) Assignee: GDM Holding LLC, Mountain View, CA (US)

( * ) Notice: Subject to any disclaimer, the term of this patent is extended or adjusted under 35 U.S.C. 154(b) by 772 days.

(21) Appl. No.: 16/968,336

(22) PCT Filed: Feb. 11, 2019

(86) PCT No.: PCT/EP2019/053327
§ 371 (c)(1),
(2) Date: Aug. 7, 2020

(87) PCT Pub. No.: WO2019/155065
PCT Pub. Date: Aug. 15, 2019

(65) Prior Publication Data
US 2021/0097401 A1 Apr. 1, 2021

Related U.S. Application Data

(60) Provisional application No. 62/628,899, filed on Feb. 9, 2018.

(51) Int. Cl.
*G06N 3/088* (2023.01)
*A63F 13/67* (2014.01)
(Continued)

(52) U.S. Cl.
CPC .............. *G06N 3/088* (2013.01); *A63F 13/67* (2014.09); *G06N 3/045* (2023.01); *G06N 3/084* (2013.01); *G05D 1/0221* (2013.01); *G06Q 10/08* (2013.01)

(58) Field of Classification Search
CPC ........ G06N 3/088; G06N 3/045; G06N 3/084; A63F 13/67; G05D 1/0221; G06Q 50/28; G06Q 10/08
See application file for complete search history.

(56) References Cited

U.S. PATENT DOCUMENTS 10,276,149 B1 * 4/2019 Liang ..................... G10L 13/033
10,936,947 B1 * 3/2021 Flunkert ................ G06N 3/044
(Continued)

FOREIGN PATENT DOCUMENTS

CN 107346326 11/2017

OTHER PUBLICATIONS

Paul Glasserman, The Normal Distribution (from Columbia Business School), Fall 2001 (Year: 2001).*
(Continued)

*Primary Examiner* — Tewodros E Mengistu
(74) *Attorney, Agent, or Firm* — Fish & Richardson P.C.

(57) ABSTRACT

According to a first aspect a network system to generate output data values from input data values according to one or In more learned data distributions comprises an input to receive a set of observations, each comprising a respective first data value for a first variable and a respective second data value for a second variable dependent upon the first variable. The system may comprise an encoder neural net-
(Continued)

work system configured to encode each observation of the set of observations to provide an encoded output for each observation. The system may further comprise an aggregator configured to aggregate the encoded outputs for the set of observations and provide an aggregated output. The system may further comprise a decoder neural network system configured to receive a combination of the aggregated output and a target input value and to provide a decoder output. The target input value may comprise a value for the first variable and the decoder output may predict a corresponding value for the second variable.

20 Claims, 3 Drawing Sheets

(51) Int. Cl.

| | |
|---|---|
| *G05D 1/00* | (2024.01) |
| *G06N 3/045* | (2023.01) |
| *G06N 3/084* | (2023.01) |
| *G06Q 10/08* | (2024.01) |

(56) References Cited

U.S. PATENT DOCUMENTS

| | | | | |
|---|---|---|---|---|
| 2013/0222377 | A1* | 8/2013 | Bruls | H04N 19/597 |
| | | | | 345/419 |
| 2017/0147944 | A1* | 5/2017 | Csurka | G06N 3/02 |
| 2017/0200076 | A1* | 7/2017 | Vinyals | G06N 3/044 |
| 2017/0228662 | A1* | 8/2017 | Gu | G06N 3/042 |
| 2017/0243131 | A1 | 8/2017 | Kephart et al. | |
| 2017/0293836 | A1* | 10/2017 | Li | G06N 3/044 |
| 2018/0025257 | A1* | 1/2018 | van den Oord | G06N 3/045 |
| | | | | 375/240.14 |
| 2018/0032082 | A1* | 2/2018 | Shalev-Shwartz | G05D 1/0246 |
| 2018/0196800 | A1* | 7/2018 | Volkovs | G06F 40/289 |
| 2019/0026631 | A1* | 1/2019 | Carr | G06N 3/084 |
| 2019/0057683 | A1* | 2/2019 | Sak | G06N 3/084 |
| 2019/0095798 | A1* | 3/2019 | Baker | G06F 18/24 |
| 2019/0188882 | A1* | 6/2019 | Son | G06T 3/04 |
| 2019/0228312 | A1* | 7/2019 | Andoni | G06F 18/2433 |

OTHER PUBLICATIONS

Germain, CriPAV: Street-Level Crime Patterns Analysis and Visualization (Year: 2015).*

Yang, High-Resolution Image Inpainting using Multi-Scale Neural Patch Synthesis (Year: 2017).*

Aaron van den Oord, Pixel Recurrent Neural Networks (Year: 2016).*

Van den Oord, Conditional Image Generation with PixelCNN Decoders, 2016 (Year: 2016).*

Blundell et al., "Weight uncertainty in neural networks," CoRR, May 2015, 10, arXiv:1505.05424, 10 pages.

Bornschein et al., "Variational memory addressing in generative models," Advances in Neural Information Processing Systems, 2017, pp. 3920-3929.

Damianou et al., "Variational auto-encoded deep Gaussian processes," CoRR, Nov. 2015, arXiv:1511.06455, 11 pages.

Devlin et al., "Neural program metainduction," Advances in Neural Information Processing Systems, 2017, pp. 2080-2088.

Edwards et al., "Towards a neural statistician," CoRR, Jun. 2016, arXiv:1606.02185, 13 pages.

Finn et al., "Model-agnostic meta-learning for fast adaptation of deep networks," CoRR, Mar. 2017, arXiv:1703.03400, 13 pages.

Gal et al., "Dropout as a bayesian approximation: Representing model uncertainty in deep learning," International conference on machine learning, Jun. 2016, pp. 1050-1059.

Garnelo et al., "Conditional Neural Processes," CoRR, Jul. 2018, arxiv.org/abs/1807.01613, 10 pages.

Garnelo et al., "Towards deep symbolic reinforcement learning," CoRR, Sep. 2016, arXiv:1609.05518, 13 pages.

Gregor et al., "Draw: A recurrent neural network for image generation," arXiv preprint arXiv:1502.04623, Feb. 2015, 10 pages.

Hewitt et al., "The variational homoencoder: Learning to learn high capacity generative models from few examples," CoRR, Jul. 2018, arXiv:1807.08919, 10 pages.

Kingma et al., "Adam: A method for stochastic optimization," CoRR, Dec. 2014, arXiv:1412.6980, 15 pages.

Kingma et al., "Auto-encoding variational bayes," CoRR, Dec. 2013, arXiv:1312.6114, 14 pages.

Koch et al., "Siamese neural networks for one-shot image recognition," ICML Deep Learning Workshop, Jul. 2015, 2:30.

Lake et al. "Human-level concept learning through probabilistic program induction," Science, Dec. 2015, 350(6266):1332-1338.

Lake et al., "Building machines that learn and think like people," Behavioral and Brain Sciences, 2017, 40:58.

LeCun et al., "Gradient-based learning applied to document recognition," Proceedings of the IEEE, Nov. 1998, 86(11):2278-2324.

Liu et al., "Deep learning face attributes in the wild," Proceedings of International Conference on Computer Vision, Dec. 2015, pp. 3730-3738.

Louizos et al., "Bayesian compression for deep learning," Advances in Neural Information Processing Systems, 2017, pp. 3290-3300.

Louizos, "Multiplicative normalizing flows for variational bayesian neural networks," CoRR, Mar. 2017, arXiv:1703.01961, 11 pages.

PCT International Preliminary Report on Patentability in International Appln. No. PCT/EP2019/053327, dated May 17, 2019, 12 pages.

PCT International Search Report and Written Opinion in International Appln. No. PCT/EP2019/053327, dated Aug. 20, 2020, 18 pages.

Rasmussen et al., "Gaussian processes in machine learning," Advanced lectures on machine learning, Feb. 2003, pp. 63-71.

Reed et al., "Few-shot autoregressive density estimation: Towards learning to learn distributions," CoRR, Oct. 2017, arXiv:1710.10304, 11 pages.

Rezende et al., "One-shot generalization in deep generative models," International Conference on Machine Learning, Mar. 2016, pp. 1521-1529.

Rezende et al., "Stochastic backpropagation and approximate inference in deep generative models," CoRR, Jan. 2014 , arXiv:1401.4082, 14 pages.

Salimbeni et al., "Doubly stochastic variational inference for deep gaussian processes," Advances in Neural Information Processing Systems, 2017, pp. 4591-4602.

Santoro et al., "One-shot learning with memory-augmented neural networks," CoRR, May 2016, arXiv:1605.06065, 13 pages.

Snelson et al., "Sparse gaussian processes using pseudo-inputs," Advances in neural information processing systems, 2006, pp. 1257-1264.

Snoek et al., "Scalable bayesian optimization using deep neural networks," Proceedings of the 32 nd International Conference on Machine Learning, Jul. 2015, 37:2171-2180.

Van den Oord et al., "Conditional image generation with pixelcnn decoders," Advances in Neural Information Processing Systems, 2016, pp. 4790-4798.

Vinyals et al. "Matching networks for one shot learning," Advances in Neural Information Processing Systems, 2016, pp. 3630-3638.

Wang et al., "Learning to reinforcement learn," CoRR, Nov. 2016, arXiv:1611.05763, 17 pages.

Wilson et al., "Deep kernel learning," Artificial Intelligence and Statistics, May 2016, pp. 370-378.

Office Action in European Appln. No. 19704799.6, dated Sep. 28, 2022, 11 pages.

Hao et al., "Advances on application of deep learning for video object tracking," Acta Automatica Sinica, Jun. 15, 2016, 42(6):834-847.

Office Action in Chinese Appln. No. 20198009347.3, dated Jan. 3, 2024, 25 pages.

Notice of Allowance in Chinese Appln. No. 201980009347.3, dated Jul. 25, 2024, 6 pages (with English translation).

(56)                        References Cited

OTHER PUBLICATIONS

Vaswani et al., "Attention Is All You Need," 31st Conference on Neural Information Processing System, 2017, 11 pages.

* cited by examiner

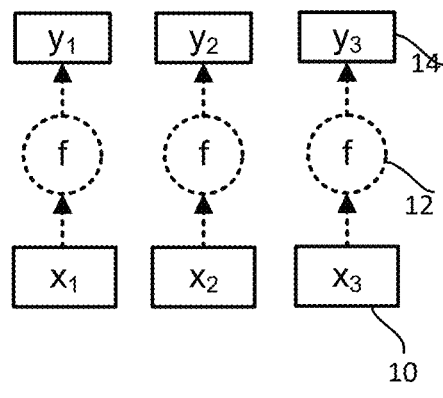
Observations            Targets
FIG. 1A
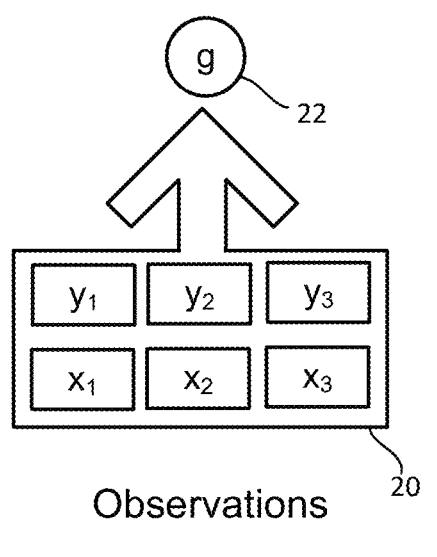
Observations
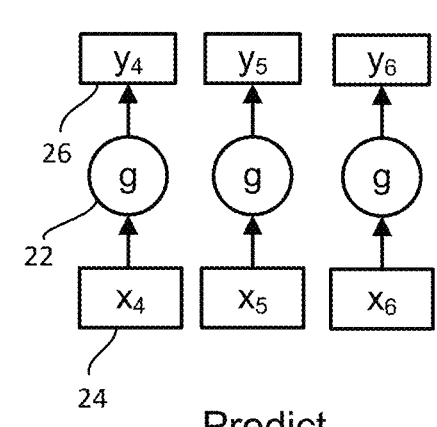
Predict
FIG. 1B
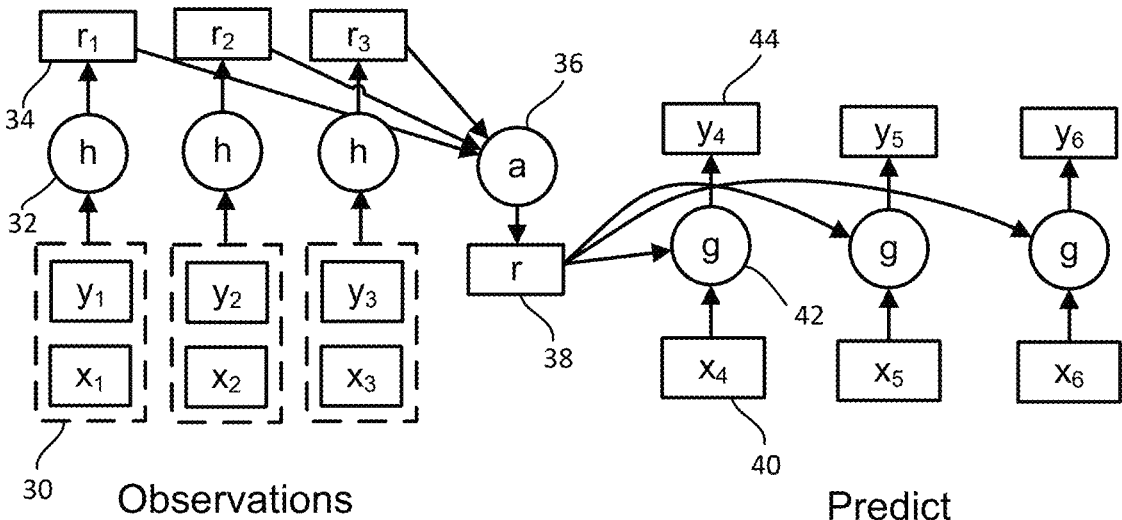
Observations            Predict
FIG. 1C

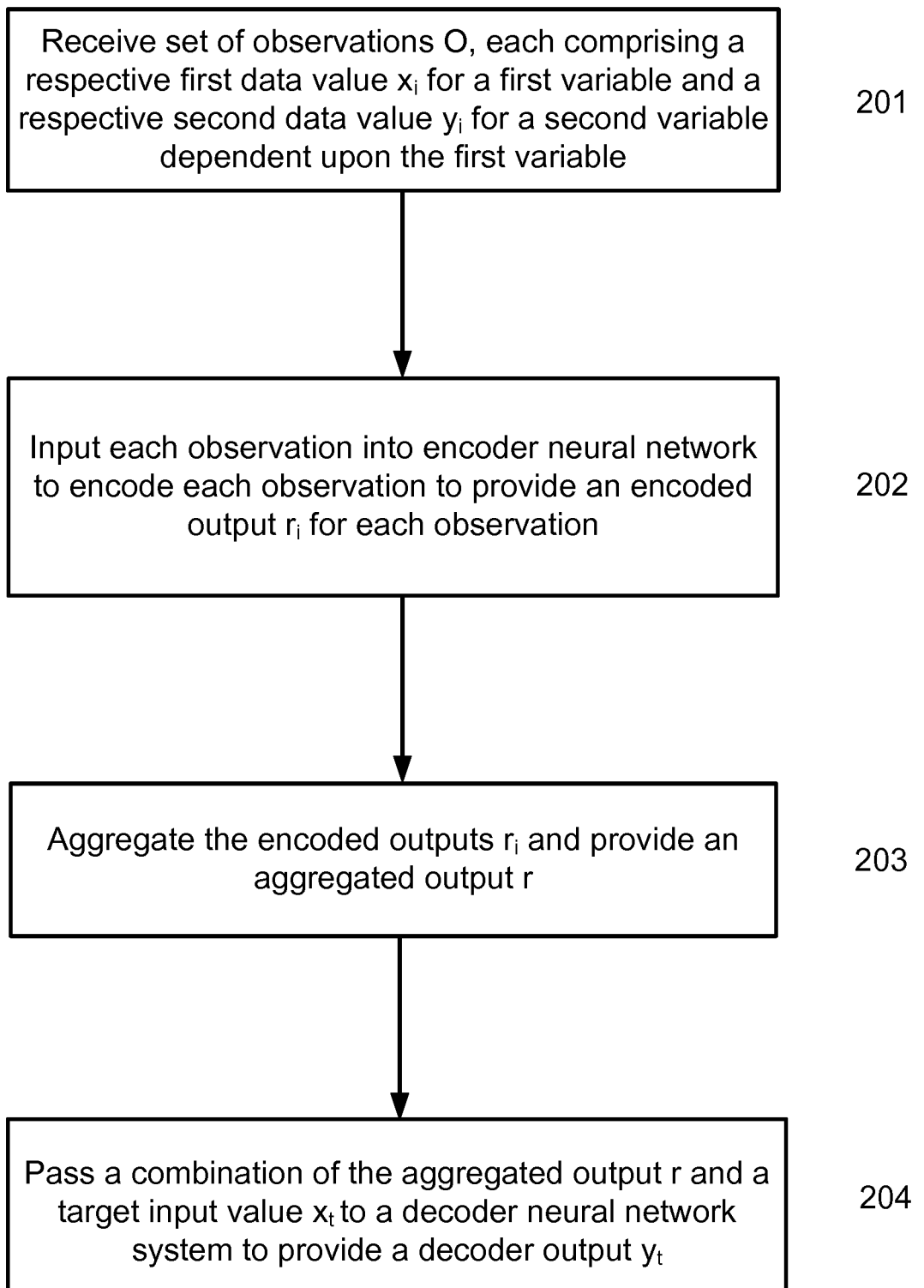

Receive set of observations O, each comprising a respective first data value $x_i$ for a first variable and a respective second data value $y_i$ for a second variable dependent upon the first variable

201

Input each observation into encoder neural network to encode each observation to provide an encoded output $r_i$ for each observation

202

Aggregate the encoded outputs $r_i$ and provide an aggregated output r

203

Pass a combination of the aggregated output r and a target input value $x_t$ to a decoder neural network system to provide a decoder output $y_t$

NEURAL NETWORK SYSTEMS IMPLEMENTING CONDITIONAL NEURAL PROCESSES FOR EFFICIENT LEARNING

CROSS-REFERENCE TO RELATED APPLICATION

This application is a National Stage Application under 35 U.S.C. § 371 and claims the benefit of International Application No. PCT/EP2019/053327, filed on Feb. 11, 2019, which claims priority to U.S. Provisional Application Ser. No. 62/628,899, filed on Feb. 9, 2018. The disclosure of the prior application is considered part of and is incorporated by reference in the disclosure of this application.

BACKGROUND

This specification relates to neural network systems that generate output data values.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network

SUMMARY

This specification describes a system implemented as computer programs on one or more computers in one or more locations that generate output data values, for example predicted observations.

According to a first aspect a network system to generate output data values from input data values according to one or more learned data distributions comprises an input to receive a set of observations, each comprising a respective first data value for a first variable and a respective second data value for a second variable dependent upon the first variable. The system may comprise an encoder neural network system configured to encode each observation of the set of observations to provide an encoded output for each observation. The system may further comprise an aggregator configured to aggregate the encoded outputs for the set of observations and provide an aggregated output. The system may further comprise a decoder neural network system configured to receive a combination of the aggregated output and a target input value and to provide a decoder output. The target input value may comprise a value for the first variable and the decoder output may predict a corresponding value for the second variable.

Some implementations of the neural network system can learn general information from the set of observations, aggregating this knowledge and using the aggregated knowledge to facilitate further learning. The system may learn one or more distributions conditioned on the set of input observations, for example by embedding the observations and aggregating the embeddings and then conditioning a data generator, that is the decoder neural network system, on the aggregated embeddings.

The first and second data values and target input value may comprise single data values or vectors, for example defining images or audio segments. There may be a single physical input to the system for these data/target values. The aggregated output may be invariant under permutations of observations of the set of observations, for example by using a mean value function for the aggregator. A permutation may be considered a changing of the order of the values. Accordingly, the aggregator may be a symmetric aggregator. The aggregated parameter may have a predefined size. The size may relate to the number of bits and/or dimensions of the parameter.

The system may be configured to perform a set of operations for each of a plurality of training steps. The operations may comprise selecting, from the observations, a subset of observations for input to the encoder neural network system and a set of targets for training the system. The operations may further comprise encoding each observation of the subset of observations using the encoder neural network system to provide an encoded output for each observation. The operations may further comprise aggregating the encoded outputs. The operations may further comprise combining, for example concatenating, the aggregated of the encoded outputs with each of the first data values from the set of targets to provide a set of combinations for decoding. The operations may further comprise decoding each of the set of combinations using the decoder neural network system to provide a set of decoder outputs. The operations may further comprise training the encoder neural network system and decoder neural network system with back propagation using a loss function dependent upon the set of decoder outputs and the second data values of the set of targets.

The encoder and decoder may each comprise a feedforward neural network such as a multilayer perceptron (MLP), and/or the encoder may comprise a convolutional neural network, for example when the input data includes images, and/or the decoder may comprise a de-convolutional neural network.

The decoder output may define parameters of a decoder output distribution. The system may then be configured to determine the corresponding value for the second variable from the decoder output distribution. For example, the system may sample from the distribution or just output a mean value. For example the decoder output distribution may define a mean and variance for the corresponding value for the second variable. The mean and variance may be for a Gaussian distribution which may be used to determine the corresponding value for the second variable, and optionally an uncertainty for the second variable. Thus the system may be configured to perform a regression task.

The regression task may be an image or sound completion task. For example the first data values may comprise space and/or time indices (e.g. specifying the location of a sample such as a pixel or audio value in space and/or time). The second data values may then comprise image or sound data values corresponding to the space and/or time indices. The target input value may then define a space and/or time index for an image or sound data value to be generated.

In some other implementations the system may be configured to perform a classification task. For example, the first data values may comprise image or sound data (such as a vector defining a data item including digitized image or sound data), and the second data values may comprise classifications of the image or sound data. The decoder output distribution may define a probability distribution over the classifications (e.g. via training).

For a classification task, the aggregation of the encoded observations may include, for each class, the aggregation of the encoded first data values for the observations in the class (e.g. via a permutation invariant aggregation such as the calculation of a mean). The aggregated values for each class can then be combined (e.g. via concatenation) to form the aggregated output (a combined aggregated output) that is input into the decoder neural network system.

In some other implementations, the system may be configured to perform a text classification task. The first data values may comprise text data and the second data values comprise classifications of the text or sound data.

In some other implementations, the system may be configured to control an agent interacting with an environment. This may be implemented via reinforcement learning. In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation. Optionally the observation at a time step may include data from a previous time step e.g., the action performed at the previous time step, the reward received at the previous time step, and so forth.

In some implementations, the environment is a real-world environment and the agent is an electromechanical agent interacting with the real-world environment. For example, the agent may be a robot or other static or moving machine interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent interacts with the environment, for example sensor data from an image, distance, or position sensor or from an actuator.

In these implementations, the actions may be control inputs to control the robot, e.g., torques for the joints of the robot or higher-level control commands; or to control the autonomous or semi-autonomous land or air or sea vehicle, e.g., torques to the control surface or other control elements of the vehicle or higher-level control commands; or e.g. motor control data. In other words, the actions can include for example, position, velocity, or force/torque/acceleration data for one or more joints of a robot or parts of another mechanical agent.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. A simulated environment can be useful for training a reinforcement learning system before using the system in the real world. In another example, the simulated environment may be a video game and the agent may be a simulated user playing the video game. Generally in the case of a simulated environment the observations may include simulated versions of one or more of the previously described observations or types of observations and the actions may include simulated versions of one or more of the previously described actions or types of actions.

Accordingly, in some implementations the first data values may comprise control signals and/or sensor data for a mechanical device such as a robot or semi-autonomous or autonomous vehicle. The second data values may comprise data values characterizing the predicted behavior of the mechanical device in response to the control signals and/or sensor data. The mechanical device may be controlled in response to the predicted behavior.

In some implementations the combination of the aggregated output and the target input value comprises a concatenation of the aggregated output and the target input value. In some implementations aggregating the encoded outputs comprises calculating a mean of the encoded outputs.

In some implementations the combination received by the decoder neural network system further comprises a set of latent variables which together characterize the target input value, for example defining a class to which the target input value belongs. In this way the system can be used to define a target type, such as a type or example of target image, to which the predicted second variable should belong. In this way an example of the target type may be generated, by fixing the set of latent variables and generating values for the second variable, for example to generate a set of pixels for an image of the target type, or a set of audio samples for a sound of the sound type, or more generally a sample from a specified learned distribution. The system may thus also be used to convert from one data mode to another. For example the sound or image type may be defined by text, and thus the system may be used to generate an image or sound corresponding to the text, or the latent variables may be generated from another sound sample in the case of automated translation.

The system may be configured to determine parameters of a distribution of the set of latent variables. The decoder neural network system may then be configured to sample from the distribution of the set of latent variables to provide the decoder output. The sampled latent variables can be combined with (e.g. concatenated to) the aggregated output and input into the decoder neural network.

For example, the system may comprise a prior neural network to determine the parameters of a prior distribution of the set of latent variables from the set of observations and a posterior neural network to determine the parameters of a posterior distribution of the set of latent variables from the set of targets. During training the prior and posterior distributions may become increasingly similar, so that the values predicted based on the target and latent variables more closely approach those of the observations used during training.

In general the predicted data values may correspond to predicted observations and may be used in a control task in a real or simulated environment to predict the outcome of a planned action in the environment. Such predictions may be used in a reinforcement learning system, for example to predict the outcome of an action.

In some implementations the system may be employed to query a database. For example a query may be provided to the system in combination with an aggregated output or parameter which encodes data in the database. The system may then provide a prediction or result of querying the database based on the target input value and on previously encoded observations of values stored in the database.

The predictions may be learned from observations derived from one or more sensors; a predicted data item may comprise data generated as if from the sensor(s) at a future time. A predicted data item may be used to fill in missing data, or in semi-supervised learning where labels are only available for a few data items, or to provide multi-modal data outputs, or to map from one domain to another. The input and/or predicted data values may comprise values for audio data such as digitized signal values, or values for still or moving images such as pixel color or luminance data; values defining the state or motion of an object; medical data such as biomarker or patient health data; musical data; recommendation data characterizing a preference or interest of a user; spatio-temporal data relating to physical and/or chemical processes; and so forth.

In one embodiment, the aggregation is via a commutative operation, such as a mean operation. This provides permutation invariance. The system may be configured to iteratively update the aggregate output as new observation(s) are received. This may be achieved by encoding the new observation to provide an encoded output (an encoded representation) of the new observation, and applying the aggregate function to aggregate the previous aggregate output with the encoded output of the new observation to produce an updated aggregate output. This updated aggregate output can be input into the decoder neural network and used to generate prediction(s) for further target input value(s).

According to a further aspect there is provided a computer implemented method for generating decoder output data values from input data values according to one or more learned data distributions. The method comprises receiving a set of observations, each comprising a respective first data value for a first variable and a respective second data value for a second variable dependent upon the first variable; inputting each observation of the set of observations into an encoder neural network system to encode each observation to provide an encoded output for each observation; inputting each encoded output into an aggregator to aggregate the encoded outputs and provide an aggregated output; and inputting a combination of the aggregated output and a target input value into a decoder neural network system to provide a decoder output, wherein the target input value comprises a value for the first variable and the decoder output predicts a corresponding value for the second variable.

According to a further aspect there is provided a method for generating output data values from input data values according to one or more learned data distributions. The method may comprise receiving a target input value relating to a domain, the target input value being for a first variable. The method may further comprise combining the target input value with an aggregated parameter that is an aggregate of a plurality of parameters encoded via an encoder neural network from a set of training observations relating to the domain, each of the training observations comprising a respective first data value for the first variable and a respective second data value for a second variable dependent upon the first variable. The method may further comprise inputting the combination of the target input value and the aggregated parameter into a decoder neural network system to provide a decoder output that predicts a value for the second variable corresponding to the target input value.

By making use of the aggregated parameter, that can be considered to encode information about the training observations (relating to the same domain as the target input value) the neural network may more effectively determine predictions for the second variable. The training observations and target input value relate to the same domain in that they share similar attributes (for instance, relate to the same type of data).

In one implementation the method further comprises, for each of a plurality of training steps: receiving a training set of observations, each comprising a respective first data value for the first variable and a respective first data value for the second variable; combining the aggregated parameter with each of the first data values from the training set of observations to provide a set of combinations for decoding; decoding each of the set of combinations using the decoder neural network system to provide a set of decoder outputs; and training the decoder neural network system with back propagation using a loss function dependent upon the set of decoder outputs and the second data values of the set of targets.

By making use of the aggregated parameter the encoder neural network may be trained more quickly and efficiently.

Implementations described herein may be embodied in a system comprising one or more computers and one or more storage devices storing instructions that when executed by the one or more computers cause the one or more computers to perform the operations of the methods described herein.

Furthermore, implementations may be embodied in one or more computer-readable storage media storing instructions that when executed by one or more computers cause the one or more computers to implement the systems or methods described herein.

Any reference herein to a set of values should be interpreted to mean a set of one or more values. Accordingly, the set of observations may be one or more observations. Equally, the set of targets may be one or more targets.

The subject matter described in this specification can be implemented in particular embodiments so as to realize one or more of the following advantages.

Some implementations of the neural network system can learn faster, and with less data, than conventional systems because they are able to rely on learned distributions from the training data and to use this knowledge to learn similar distributions more quickly. Thus, for example, the system may be trained on observations of several different robot arms and learn, in general terms, how robot arms behave. The system may then be able to learn much more quickly how a particular new robot arm behaves. Thus the system may be able to learn to make predictions faster and more accurately, consuming less memory and with less computational resources.

The methods and systems described herein provide flexibility for application on a variety of related tasks and datasets with reduced training as learning can be shared between tasks. Furthermore, the mechanisms described herein avoid the need for the pre-specified prior, as in stochastic processes, by learning prior knowledge during training and encoding this in the form of an aggregated parameter for use in conditioning the decoder neural network system.

Some implementations of the neural network system are scalable to large datasets and complex distributions. By making use of an aggregate of encoded outputs, the neural network systems described herein are more efficient, and scale more effectively, than alternative methods such as Gaussian processes. For instance, whilst Gaussian processes are able to adapt to different data sets, they scale poorly, quickly becoming computationally intractable as the dataset or dimensionality grows. In contrast, the methods and systems described herein scale more efficiently. For a set of n observations and a set of m targets the running time complexity of embodiments is in the order of $O$ (n+m) as the n observations are aggregated into a single representation. This is more efficient than alternative methods that can have running time complexities in the order of $O$ (nm). Thus distributions may be learned from large datasets with relatively less resources than conventional techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A shows a schematic representation of a general framework for a supervised learning problem;

FIG. 1B shows a schematic representation of an example of a general supervised learning training regime;

FIG. 1C shows a schematic representation of a conditional neural process (CNP) for predicting outputs according to an embodiment;

FIG. 2 shows an exemplary process for predicting decoder outputs using a conditional neural process (CNP) according to an embodiment.

DETAILED DESCRIPTION

Figure 3:
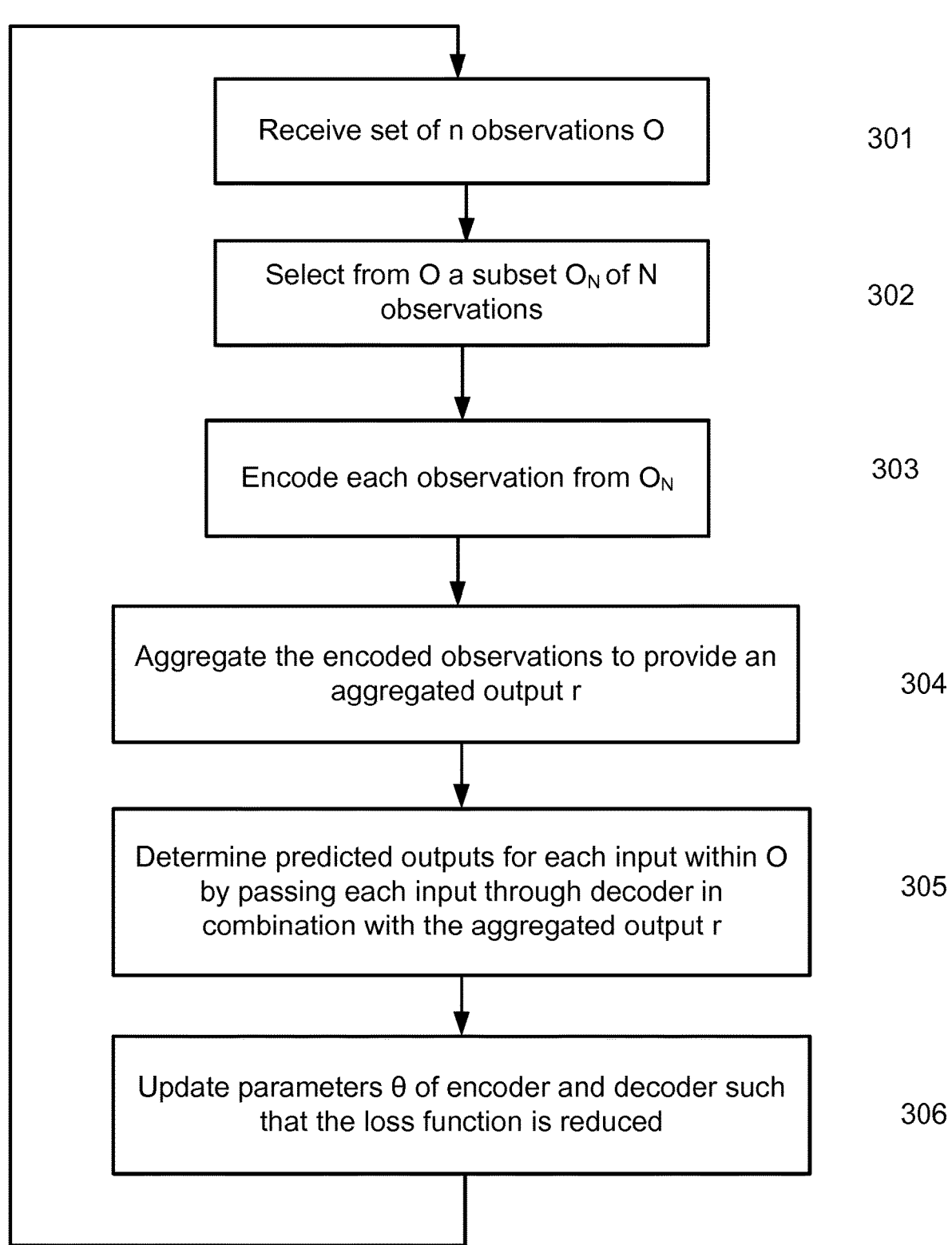
FIG. 3 shows an exemplary process for training conditional neural process (CNP) system according to an embodiment.

Deep neural networks excel at function approximation, yet they are typically trained from scratch for each new function. On the other hand, Bayesian methods, such as Gaussian Processes (GPs), exploit prior knowledge to quickly infer the shape of a new function at test time. Yet GPs are computationally expensive, and it can be hard to design appropriate priors.

The present application proposes a new family of neural models, Conditional Neural Processes (CNPs), that combine the benefits of both neural networks and Bayesian methods. CNPs are inspired by the flexibility of stochastic processes such as GPs, but are structured as neural networks and trained via gradient descent. CNPs make accurate predictions after observing only a handful of training data points, yet scale to complex functions and large datasets.

In light of the above, embodiments described herein provide improved predictive neural networks that are able to be accurately trained on fewer datasets. This ensures accuracy whilst improving the computational efficiency of the system by avoiding the need to process large numbers of labelled datasets. CNPs are scalable, achieving a running time complexity of $O$ (n+m) for making m predictions with n observations. This is significantly more efficient than equivalent systems that have a running time complexity of $O$ (nm).

The performance and versatility of CNPs ensure that they can be applied to a range of canonical machine learning tasks, including regression, classification and image completion.

Supervised learning problems can generally be framed as function approximation given a finite set of observations. Classification, regression, dynamics modelling, and image generation can all be cast in this framework.

FIG. 1A shows a schematic representation of a general framework for a supervised learning problem. A set of observations include inputs 10 and output 14. The inputs are mapped to the outputs via a corresponding hidden function 12 (hidden functions and parameters are indicated via dashed lines). A set of targets 16 include inputs but have unknown outputs 18.

The observations are a dataset $$\{(x_i, y_i)\}_{i=0}^{n-1}$$

of n inputs $x_i \in X$ and outputs $y_i \in Y$. These are assumed to represent evaluations $y_i = f(x_i)$ of some unknown function f: $X \rightarrow Y$, which may be fixed or a realization of some random function.

FIG. 1B shows a schematic representation of an example of a general supervised learning training regime. A set of known observations 20 including inputs and outputs are used to determine an approximation 22 g of the hidden function f. This approximating function 22 can then be used to predict the outputs 26 for a set of inputs 24 by providing a mapping from the inputs to the outputs.

More formally, a supervised learning algorithm returns an approximating function g: $X \rightarrow Y$ or a distribution over such functions. The aim is to minimize a loss between f and g on the entire space X, but in practice the routine is evaluated on a finite set of observations that are held-out (making them effectively unlabelled). These unlabelled data points are called targets. By minimizing the loss between f and g the approximation function g can be fit to the observed data in order to empirically determine a function that accurately predicts outputs for given inputs.

One approach to supervised problems is to randomly initialize a parametric function g anew for each new task and spend the bulk of computation on a costly fitting phase. Prior information that a practitioner may have about f is specified via the architecture of g, the loss function, or the training details. This approach encompasses most of deep supervised learning. Since the extent of prior knowledge that can be expressed in this way is relatively limited, and learning cannot be shared between different tasks, the amount of training required is large, and deep learning methods tend to fail when training data is not plentiful.

Another approach is to take a probabilistic stance and specify a distribution over functions, known as stochastic processes; Gaussian Processes (GPs) are an example. On this view, a practitioner's prior knowledge about f is captured in the distributional assumptions about the prior process and learning corresponds to Bayesian inference over the functional space conditioned on the observed values. In the GP example, assumptions on the smoothness of f are captured a priori via a parametric kernel function, and g is taken to be a random function distributed according to the predictive posterior distribution. Unfortunately, such Bayesian approaches quickly become computationally intractable as the dataset or dimensionality grows.

The present application proposes a new family of models that represent solutions to the supervised problem, and an end-to-end training approach to learning them, that combine neural networks with features reminiscent of Gaussian Processes. This family of models is called Conditional Neural Processes (CNPs), as an allusion to the fact that they define conditional distributions over functions given a set of observations. The dependence of a CNP on the observations is parametrized by a neural network that is invariant under permutations of its inputs. Embodiments described herein comprise architectures that scale as $\mathcal{O}$ (n+m), where n, m are the number of observations and targets, respectively.

In its most basic form a CNP embeds each observation, aggregates these embeddings into a further embedding of fixed dimension with a symmetric aggregator, and conditions the function g on the aggregate embedding.

FIG. 1C shows a schematic representation of a conditional neural process (CNP) for predicting outputs according to an embodiment. A set of n observations 30, $$\{(x_i, y_i)\}_{i=0}^{n-1},$$

are input into a neural network encoder $h_\theta$ 32 that maps the each observation to a corresponding encoded observation $r_i$ 34 according to parameters $\theta$.

The set of encoded observations 34 are then input into an aggregator 36 that aggregates all of the encoded observations to produce an aggregation r 38 based on an aggregation operation a.

The aggregation 38 is then utilised to condition a neural network decoder go 42 when predicting the output 44 for a target input 40. That is, the neural network decoder 42 takes, as input, the aggregation r and a target input $x_i$ and maps it to an output $y_i$ based on parameters $\theta$.

CNPs can be trained by sampling a random dataset and following a gradient step to maximize the conditional likelihood of a random subset of targets given a random observation set. This encourages CNPs to perform well across a variety of settings, i.e. n<<m or n>>m.

To frame the problem, consider a set, $$O = \{(x_i, y_i)\}_{i=0}^{n-1} \subset X \times Y$$

of pairs of inputs $x_i \in X$ and outputs $y_i \in Y$ and another set $$T = \{(x_i)\}_{i=n}^{n+m-1} \subset X$$

of unlabelled points. These are called the set of observations and targets respectively. It is assumed that the outputs are a realization of the following process; let P be a probability distribution over functions f: $X \rightarrow Y$, formally known as a stochastic process, then for f~P, set $y_i = f(x_i)$. P defines a joint distribution over the random variables $$\{f(x_i)\}_{i=0}^{n+m-1},$$

and therefore a conditional distribution P(f(T)|O, T); the system's task is to predict the output values f(x) for every $x \in T$ given O. That is, the system predicts the outputs values for each target input value given a set of labelled observations.

As a motivating example, consider a random 1-dimensional function f~P defined on the real line (i.e. X:=$\mathbb{R}$, Y:=$\mathbb{R}$). O would constitute n observations of f's value $y_i$ at different locations $x_i$ on the real line. Given these observations, the aim is to predict f's value at new locations on the real line. A classic assumption to make on P is that all finite sets of function evaluations of f are jointly Gaussian distributed. This class of random functions are known as Gaussian Processes (GPs). In this case, the predictive distribution P(f(T)|O, T) has a simple analytic form defined by prior assumptions on the pairwise correlation structure (specified via a kernel function). The framework of stochastic processes is appealing, because Bayes rule allows one to reason consistently about the predictive distribution over f imposed by observing O under a set of probabilistic assumptions. This allows the model to be data efficient, an uncommon characteristic in most deep learning models. However, in practice, it is difficult to design appropriate priors and most interesting examples of stochastic processes are computationally expensive, scaling poorly with n and m. This includes GPs which scale as $\mathcal{O}$ ((n+m)$^3$).

To overcome this problem, the embodiments described herein make use of a novel mechanism for modelling outputs termed Conditional Neural Processes (CNPs). These are much more efficient than alternative methods such as GPs, scaling as $\mathcal{O}$ (n+m).

CNPs directly parametrize conditional stochastic processes without imposing consistency with respect to some prior process. CNPs parametrize distributions over f(T) given a distributed representation of O of fixed dimensionality. By doing this, the model sacrifices the mathematical guarantees associated with stochastic processes, trading this off for functional flexibility and scalability. Specifically, given a set of observations O, a CNP is a conditional stochastic process $Q_\theta$ that defines distributions over f(x) for inputs $x \in T$. $\theta$ is the real vector of all parameters defining Q. Inheriting from the properties of stochastic processes, it is assumed that $Q_\theta$ is invariant to permutations of O and T. If O', T' are permutations of O and T, respectively, then $Q_\theta(f(T)|O, T)=Q_\theta(f(T')|O, T')=Q_\theta(f(T)|O', T)$. In the present embodiment, permutation invariance is generally enforced with respect to T by assuming a factored structure. Specifically, $Q_\theta$s are utilised that factor $Q_\theta(f(T)|O, T)=\Pi_{x \in T}Q_\theta(f(x)|O, x)$. In the absence of assumptions on output space Y, this is the easiest way to ensure a valid stochastic process. Still, this framework can be extended to non-factored distributions. Embodiments utilising such a model are described below.

The defining characteristic of a CNP is that it conditions on O via an embedding of fixed dimensionality. In more detail, the following architecture is utilised, $$r_i = h_\theta(x_i, y_i) \quad \forall (x_i, y_i) \in O \tag{1}$$

$$r = r_1 \oplus r_2 \oplus \ldots r_{n-1} \oplus r_n \tag{2}$$

$$\phi_i = g_\theta(x_i, r) \quad \forall (x_i) \in T \tag{3}$$

where $h_\theta$: $X \times Y \rightarrow \mathbb{R}^d$ is a neural network encoder, $g_\theta$: $X \times \mathbb{R}^d \rightarrow \mathbb{R}^e$ is a neural network decoder, $\oplus$ is a commutative operation that takes elements in $\mathbb{R}^d$ and maps them into a single element of $\mathbb{R}^d$, and $\phi_i$ are parameters for $Q_\theta(f(x_i)|O, x_i)=Q(f(x_i)|\phi_i)$.

Accordingly, a CNP outputs the parameters for a probabilistic distribution. Depending on the task, the model learns to parametrize a different output distribution. For regression tasks $\phi_i$ can be used to parametrize the mean and variance $$\phi_i = \left( \mu_i, \sigma_i^2 \right)$$

of a Gaussian distribution $\mathcal{N}(\mu_i, \sigma_i^2)$ a for every $x_i \in T$. For classification tasks $\phi_i$ can be used to parametrize the class probabilities $p_c$ over the c classes of a classical distribution. In specific embodiments, the logits of the class probabilities may be parameterised (e.g. via a logits layer) such that the probabilities scale as real numbers between $-\infty$ and $+\infty$. In specific embodiments, the aggregator function $a_1 \oplus \ldots \oplus a_n$ is taken to be the mean operation $(a_1 + \ldots + a_n)/n$, although alternative aggregator functions are available.

FIG. 2 shows an exemplary process for predicting decoder outputs using a conditional neural process (CNP) according to an embodiment. This method makes use of the CNP arrangement shown in FIG. 1C.

Initially, the system receives a set of observations, O, each comprising a respective data value $x_i$ for a first variable and a respective second data value $y_i$ for a second variable dependent upon the first variable 201. These observations may be computer readable data representing a variety of forms of content such as video data, numerical data, picture data, sensor data, classification data, etc. These observations are labelled observations that are used to condition the decoder.

Each observation is then input into an encoder neural network to encode each observation to provide an encoded output for each observation 202. The encoder neural network may be a multi-layer perceptron (MLP) configured according to the dimensions it is required to input and output. In one embodiment, the encoder is a three-layer MLP, although other types of encoder and numbers of layers may be used. The encoder maps the observations onto a latent space according to the parameters $\theta$ of the encoder neural network (as discussed with reference to Equation (1)). In this way, the encoder produces a set of encoded outputs (encoded observations), $$\{r_i\}_{i=1}^n$$

according to a learned function $h_\theta(x_i)$.

The encoded outputs $$\{r_i\}_{i=1}^n$$

are then aggregated to provide an aggregated output r 203. The encoded outputs are aggregated according to an aggregation function (as discussed with reference to Equation (2)). The aggregation function is a commutative operation that is permutation invariant. The aggregation function may comprise taking the mean of the encoded outputs.

The aggregated output r is then combined with a target input value $x_t$ and passed to a decoder neural network system which takes the combination as an input and provides a decoder output 204. The decoder output $y_t$ is a prediction of an output for the target input value $x_t$ conditioned on the aggregation r of the encoded observations. The aggregated output r and the target input value $x_t$ may be combined via concatenation.

The decoder neural network may be a multi-layer perceptron (MLP) configured according to the dimensions it is required to input and output. In one embodiment, the encoder is a five-layer MLP, although other types of decoder and numbers of layers may be used. The decoder maps the combination of the aggregated output r and the target input value $x_i$ onto an output space (having dimensions equal to $y_i$) according to the parameters $\theta$ of the decoder neural network (as discussed with reference to Equation (3)). In this way, the decoder can produce a prediction for each input target value $x_t$ according to a learned function $g_\theta(x_t)$.

The architecture described above ensures permutation invariance and $\mathcal{O}$ (n+m) scaling for conditional prediction. As the decoder is conditioned on an aggregation over a set of encoded observations, the system can be trained to a high level of accuracy and precision with fewer observations than are generally required when training standard neural networks.

It is noted that, since $r_1 \oplus \ldots \oplus r_n$ can be computed in $\mathcal{O}$ (1) from $r_1 \oplus \ldots \oplus r_{n-1}$, this architecture supports streaming observations with minimal overhead. That is, each time a new observation $r_i$ is received, the aggregate can be updated by encoding the new observation and aggregating the new encoded observation with the previous aggregate. In this case, the updated aggregate r' would be:

$$r' = r \oplus r_i = r_1 \oplus \ldots \oplus r_{i-1} \oplus r_i$$

This allows the aggregate to be updated efficiently each time a new observation is received using only the new observation and the previous aggregate as the inputs. There is therefore no need to store the original observations or their corresponding encoded representations in memory for future calculations, as the aggregate can be updated without them.

The parameters $\theta$ of the encoder neural network $h_\theta(x_i, y_i)$ and the decoder neural network $g_\theta(x_i)$ can be trained by through backpropagation, minimising a loss function (e.g. via stochastic gradient descent). In one embodiment, the neural network system $Q_\theta$ is trained by asking it to predict O conditioned on a randomly chosen subset of O. This gives the model a signal of the uncertainty over the space X inherent in the distribution P given a set of observations. More precisely, let $$f \sim P, O = \{(x_i, y_i)\}_{i=0}^{n-1}$$

be a set of observations, N~uniform[0, . . . , n−1]. The system is conditioned on the subset $$O_N = \{(x_i, y_i)\}_{i=0}^N \subset O,$$

the first N elements of O. The system is then trained by minimising the negative conditional log probability $$\mathcal{L}(\theta) = -\mathbb{E}_{f \sim P}\left[\mathbb{E}_N\left[\log Q_\theta\left(\{y_i\}_{i=0}^{n-1} | O_N, \{x_i\}_{i=0}^{n-1}\right)\right]\right] \quad (4)$$

that is, the system minimises the negative of the probability of the output $$\{(y_i\}_{i=0}^{n-1})$$

of the decoder matching the ground truth labels $$(\{x_i\}_{i=0}^{n-1}).$$

This is equivalent to maximising the probability of the output $$(\{y_i\}_{i=0}^{n-1})$$

of the decoder matching the ground truth labels $$(\{x_i\}_{i=0}^{n-1});$$

however, given that many optimizers implement loss functions, the minimization of the negative of the probability can be utilised for consistency.

Thus, the targets that the model $Q_\theta$ is scored on include both the observed and unobserved values. In specific embodiments, Monte Carlo estimates (via a probability, or Monte Carlo, simulation) of the gradient of the loss function are taken by sampling f and N.

This approach shifts the burden of imposing prior knowledge from an analytic prior to empirical data. This has the advantage of liberating a practitioner from having to specify an analytic form for the prior, which is ultimately intended to summarize their empirical experience. Still, it is emphasized that the $Q_\theta$ are not necessarily a consistent set of conditionals for all observation sets, and the training routine does not guarantee that.

FIG. 3 shows an exemplary process for training conditional neural process (CNP) system according to an embodiment.

The process begins with the receipt 301 of a set of n observations $$\{O\}_{i=0}^{n-1}.$$

The observations are labelled observations include n inputs $$\{x_i\}_{i=0}^{n-1}$$

and n outputs $$\{y_i\}_{i=0}^{n-1}.$$

subset $O_N$ of N observations is then selected from O 302. Each of the observations in the subset $O_N$ is encoded 303 to determine a set of corresponding encoded observations $$\{r_i\}_{i=0}^{n-1}.$$

The encoded observations are then aggregated 304 to provide an aggregate r. Predicted outputs are then determined 305 for each input by combining (e.g. concatenating) the aggregate r with each input in the original set of observations O (including $O_N$ and all other observations not selected in $O_N$) and inputting each combination into the decoder to determine a corresponding predicted output. The predicted outputs can be in the form of a Gaussian mean and variance for the target outputs $\hat{y}_t$.

The predicted outputs are then compared to the ground truth values $$\{y_i\}_{i=0}^{n-1} \text{ from } O)$$

and the parameters $\theta$ of the encoder and decoder are updated to reduce the loss function 306. The method can then be repeated with the updated parameters $\theta$ until the parameters converge on an optimum set of parameters that minimise the loss function, or until a maximum number of iterations has been reached. The parameters may be trained to maximise the log-likelihood of the target points. This may be achieved, for instance, using stochastic gradient descent, although a variety of optimization methods are available. In one embodiment, the parameters are optimized using an adaptive moment estimation (Adam) optimization method.

It should be noted that whilst the method of FIG. 3 determines predictions for the same observations $O_N$ that are used to generate the aggregate, in alternative embodiments different subsets of O may be used for the generation of the aggregate and the calculation of the predicted outputs.

In summary, in embodiments described herein:
1. A CNP is a conditional distribution over functions trained to model the empirical conditional distributions of functions f~P.
2. A CNP is permutation invariant in O and T.
3. A CNP is scalable, achieving a running time complexity of $\mathcal{O}$ (n+m) for making m predictions with n observations.

The methods described herein can be implemented for a variety of use cases such as classification, image completion and prediction and function regression.

For testing function regression, a curve generated from a Gaussian Process (GP) with an exponential kernel was used to train the system. The curve was sampled, selecting a subset of n points on the curve as observations and a subset of additional points as target points. The model was that shown in FIG. 1, with a three-layer MLP encoder h having a 128 dimensional output representation $r_i$ and a five-layer MLP decoder configured to output a mean and variance for each target output $\hat{y}_i$. The variance allows the system to quantify the error within the prediction.

When the trained system is compared to the predictions generated by a GP with the correct hyperparameters, which constitutes an upper bound on performance, the system is able to regress with fewer context points (observations used to generate an aggregate) than required for the GP. As the number of context points grows, the accuracy of the model improves and the uncertainty of the model decreases. Crucially, the model learns to estimate its own uncertainty given the observations very accurately. Nonetheless it provides a good approximation that increases in accuracy as the number of context points increases.

Furthermore the model achieves similarly good performance when provided with a set of context points generated by a GP in which parameters of the kernel change. This type of regression task is not trivial for GPs whereas in present embodiments can operate effectively by changing only the dataset used for training.

Image completion can be performed using the embodiments described herein as a regression task over functions in either f: $[0,1]^2 \rightarrow [0, 1]$ for grayscale images, or f: $[0,1]^2 \rightarrow [0,1]^3$ for RGB images. The input x is the 2D pixel coordinates normalized to $[0, 1]^2$, and the output y is either the grayscale intensity or a vector of the RGB intensities of the corresponding pixel. For this completion task the same model architecture as for 1D function regression can be used (with the exception of making the last layer 3-dimensional for RGB).

The training procedure involves, at each step, selecting an image from the dataset and picking a subset of the pixels as observations. Conditioned on these, the model is trained to predict the values of all the pixels in the image (including the ones it has been conditioned on). Like in 1D regression, the model outputs a Gaussian mean and variance for each pixel and is optimized with respect to the log-likelihood of the ground-truth image.

As with the 1D regression task, the system is able to make accurate predictions even with a small number of context points. Crucially, when conditioned on only one non-informative context point (e.g. a black pixel on the edge of an image) the model's prediction corresponds to the average over all training images. As the number of context points increases, the predictions become more similar to the underlying ground truth. This demonstrates the models' capacity to extract dataset specific prior knowledge. It is worth mentioning that even with a complete set of observations the model does not achieve pixel-perfect reconstruction, as there is a bottleneck at the representation level.

Since this embodiment returns factored outputs, the best prediction it can produce given limited context information is to average over all possible predictions that agree with the context. An alternative to this is to add latent variables in the model such that they can be sampled conditioned on the context to produce predictions with high probability in the data distribution. This embodiment shall be discussed below.

An important aspect of the model is its ability to estimate the uncertainty of the prediction. As more observations are added, the variance shifts from being almost uniformly spread over an image to positions localized around areas that are specific to the underlying image, e.g. edges of distinct features within the image. Being able to model the uncertainty given some context can be helpful for many tasks. One example is active exploration, where the model has a choice over where to observe. This can be tested by comparing the predictions of CNP when the observations are chosen according to uncertainty (i.e. the pixel with the highest variance at each step), versus random pixels. This method is a very simple way of doing active exploration, but it already produces better prediction results than selecting the conditioning points at random.

An important aspect of the embodiments described herein is their flexibility not only in the number of observations and targets received but also with regards to their input values. The first type of flexibility is that during testing the system can be conditioned on subsets that have not been encountered during training. For instance, the model can be conditioned on one half of an image. This forces the model to not only predict pixel values according to some stationary smoothness property of the images, but also according to global spatial properties, e.g. symmetry and the relative location of different parts of faces. The embodiments described herein are able to capture those properties. In contrast, a GP with a stationary kernel cannot capture this, and in the absence of observations would revert to its mean (the mean itself can be non-stationary but usually this would not be enough to capture the interesting properties).

In addition, the embodiments described herein are flexible with regards to the target input values. This means, e.g., the model can be queried at resolutions it has not seen during training. A model that has only been trained using pixel coordinates in a specific resolution can be used at test time to predict subpixel values for targets between the original coordinates. Only one forward pass is required to query the system at different resolutions. While GPs also exhibit this type of flexibility, it is not the case for trained generative models, which can only predict values for the pixel coordinates on which they were trained. In this sense, the methods described herein capture the best of both worlds—they are both flexible in regards to the conditioning and prediction task, and have the capacity to extract domain knowledge from a training set.

Within the above embodiments there are still some aspects that can be modified to suit specific requirements. The exact implementation of h, for example, can be adapted to the data type. For low dimensional data the encoder can be implemented as a Multi-Layer Perceptron (MLP), whereas for inputs with larger dimensions and spatial correlations it can also include convolutions. Finally, in the embodiment described above, the system is not able to produce any coherent samples, as it learns to model only a factored prediction of the mean and the variances, disregarding the covariance between target points. This is a result of this particular implementation of the model. One way coherent samples can be obtained is by introducing a latent variable that can be sampled from.

The main embodiment described above utilises a factored model that predicts the mean and variance of the target outputs. Although the mean is by itself a useful prediction, and the variance is a good way to capture the uncertainty, this factored model is unable to obtain coherent samples over multiple targets.

Consider the embodiment described above with reference to image completion, conditioned on a small number of observations. This can be implemented to complete images of digits. Rather than predicting only the mean of all digits, sometimes a system is required that can be used to sample different coherent images of all the possible digits conditioned on the observations.

GPs can do this because they contain a parametric kernel predicting the covariance between all the points in the observations and targets. This forms a multivariate Gaussian which can be used to coherently draw samples. In order to maintain this property in a trained model, one approach is to train the model to predict a GP kernel. However the difficulty is the need to back-propagate through the sampling which involves a large matrix inversion (or some approximation of it).

In contrast, according to one embodiment a system is provided that is as described above however with the addition of latent variables z to the decoder g. This allows the model to capture global uncertainty. In order to generate a coherent sample, the representation r is computed from the observations, which parametrizes a Gaussian distribution over the latents z. The latent variables z can then be sampled, with the same value being used to generate the sample for all targets (all pixels in the case of images). To obtain a different coherent sample, a new sample can be drawn from the latents z and input into the decoder again for all targets. Similar to the standard VAE this model can be trained by optimizing a variational lower bound of the log-likelihood, using a conditional Gaussian prior p (z|O) that is conditioned on the observations, and a Gaussian posterior p(z|O, T) that is also conditioned on the target points.

We use the same models as before can be used, but the representation r is instead concatenated to a vector of latent variables z. For image completion (e.g. with r of dimension 128), z may be 64. For both the prior and posterior models, three layered MLPs may be used and an average of their outputs may be taken (as for the observation encoder). It is emphasized that the difference between the prior and posterior is that the prior only sees the observed pixels, while the posterior sees both the observed and the target pixels. When sampling from this model with a small number of observed pixels, coherent samples are obtained and the variability of the datasets is captured. As the model is conditioned on more and more observations, the variability of the samples drops and they eventually converge to a single possibility.

In addition, the methods described herein can be applied to classification (e.g. image classification). In this case, aggregates are produced only over the observations from the same class by using the information provided in the input label. In other words, observations are separated out into their corresponding classes based on their labels (their ground truth classifications). The observations for the each class are encoded and then aggregated to form a class-specific aggregation. The class-specific aggregations (the aggregated class-specific representations) are then combined (e.g. concatenated) to form the final representation. This is then used as an input to condition a decoder to classify a target input. The decoder outputs, for each potential class, a probability of the target input belonging to that class.

Given that both the size of the class-specific representations and the number of classes are constant, the size of the final representation is still constant and thus the $\mathcal{O}$ (n+m) runtime still holds.

The performance of this CNP classification embodiment on the Omniglot dataset relative to alternative systems such as MANN (Santoro et al., 2106) and matching networks (MN) (Vinyals et al., 2016) is shown in Table 1.

TABLE 1

| Classification results of CNP embodiment on Omniglot relative to MANN and MN | | | | |
|---|---|---|---|---|
| 5-way Acc | | 20-way Acc | | |
| 1-shot | 5-shot | 1-shot | 5-shot | Runtime |
| MANN | | | | |
| 82.8% | 94.9% | — | — | $\mathcal{O}(nm)$ |
| MN | | | | |
| 98.1% | 98.9% | 93.8% | 98.5% | $\mathcal{O}(nm)$ |
| CNP | | | | |
| 95.3% | 98.5% | 89.9% | 96.8% | $\mathcal{O}(n+m)$ |

It can be seen that CNPs achieve higher accuracy than models that are significantly more complex (such as MANN). While CNPs do not beat these alternative methods for shot classification, the accuracy values are comparable. Crucially, those values are reached using a significantly simpler architecture and with a lower runtime of $\mathcal{O}$ (n+m) at test time as opposed to $\mathcal{O}$ (nm). The embodiments described herein therefore have comparable accuracy with much improved computational efficiency.

The embodiments described herein make use of a new set of models, Conditional Neural Processes. These models are both flexible at test time and have the capacity to extract prior knowledge from training data. The embodiments described herein are able to perform a variety of tasks including regression, classification and image completion.

It is important to note that the specific CNP implementations described here are just simple proofs-of-concept and can be substantially extended, e.g. by including more elaborate architectures in line with modern deep learning advances. In addition the model itself can be updated to become 'more Bayesian' by sharing the prior and posterior models or adding a hierarchy of latent variables, among other options.

To summarize, this work can be seen as a step towards learning high-level abstractions, one of the grand challenges of contemporary machine learning. Functions learned by most conventional deep learning models are tied to a specific, constrained statistical context at any stage of training. A trained CNP, in this sense, is more general, in that it encapsulates the high-level statistics of a family of functions. As such it constitutes a high-level abstraction that can be reused for multiple tasks. These models can help in tackling the many key machine learning problems that seem to hinge on abstraction, such as transfer learning, meta-learning, and data efficiency.

In light of the above, by conditioning an decoder using an aggregate of encoded representations of observations, the methods described herein are able to make accurate predictions based on target inputs in a much more computationally efficient method. The embodiments implement a simpler architecture that provides a reduced memory burden on the implementing computing system relative to alternative, more complex architectures. In addition, the embodiments described herein are able to obtain accurate predictions with only a small number of training observations and a only small number of training steps. This provides further improvements to efficiency as well as the ability to learn based on new observations quickly.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to perform operations comprising:

receiving a set of observations, each observation comprising image data and a classification of the image data;

for each observation in the set of observations, inputting the observation into an encoder neural network system to encode the observation including the image data and the classification of the image data to provide an encoded observation for the observation;

inputting the encoded observations for the set of observations that include both the encoded image data and the encoded classifications of the image data into an aggregator to aggregate the encoded observations and provide an aggregated parameter, the aggregating comprising applying a mean function to the encoded observations; and inputting a combination of the aggregated parameter and target image data for a target observation that includes both the target image data and a target classification of the target image data into a decoder neural network system to provide a predicted classification of the target image data.

2. The system of claim 1, wherein the operations comprise, for each of a plurality of training steps:

selecting, the set of observations, a subset of training observations for input to the encoder neural network system and a set of training target observations for training the system;

encoding each training observation using the encoder neural network system to provide an encoded observation for each training observation;

aggregating the encoded observations;

combining the aggregate of the encoded observations with respective training target image data for each training target observation in the set of training target observations to provide a set of combinations for decoding;

decoding each of the set of combinations using the decoder neural network system to provide a predicted classification of the training target image data; and training the encoder neural network system and the decoder neural network system with back propagation using a loss function dependent upon the predicted classifications for the set of training target observations and ground truth classifications for the set of training target observations.

3. The system of claim 1, wherein the operations comprise:

generating, by the decoder neural network system, a predicted distribution for the predicted classification of the target image data; and determining the predicted classification of the target image data from the predicted distribution for the predicted classification of the target image data.

4. The system of claim 3 wherein each of the image data comprises a vector defining the image data and wherein the predicted distribution for the predicted classification of the target image data defines a probability distribution over the classifications.

5. The system of claim 4, wherein the aggregator is configured to:

for each class of a plurality of potential classes for the classifications of the image data of the set of observations, determine an aggregate for the class based on the encoded image data for the observations in that class; and determine the aggregated parameter by combining the aggregates for each class of the plurality of potential classes.

6. The system of claim 1, wherein the aggregated parameter is invariant under permutations of the set of observations.

7. The system of claim 1, wherein the combination received by the decoder neural network system further comprises a set of latent variables which together characterize the target image data.

8. The system of claim 7, wherein the operations further comprise determining parameters of a distribution of the set of latent variables, and sampling, by the decoder neural network system, from the distribution of the set of latent variables to provide the predicted classification of the target image data.

9. The system of claim 8, the operations further comprise determining, by a prior neural network, the parameters of a prior distribution of the set of latent variables from the set of observations and determining, by a posterior neural network, the parameters of a posterior distribution of the set of latent variables from the target observation.

10. The system of claim 1, wherein the combination of the aggregated parameter and the target image data for the target observation comprises a concatenation of the aggregated parameter and the target image data.

11. A computer implemented method for generating decoder output data values from input data values according to one or more learned data distributions, the method comprising:

receiving a set of observations, each observation comprising image data and a classification of the image data;

for each observation in the set of observations, inputting the observation into an encoder neural network system to encode the observation including the image data and the classification of the image data to provide an encoded observation for the observation;

inputting the encoded observations for the set of observations that include both the encoded image data and the encoded classifications of the image data into an aggregator to aggregate the encoded observations and provide an aggregated parameter, the aggregating comprising applying a mean function to the encoded observations; and inputting a combination of the aggregated parameter and target image data for a target observation that includes both the target image data and a target classification of the target image data into a decoder neural network system to provide a predicted classification of the target image data.

12. The method of claim 11, comprising, for each of a plurality of training steps:

selecting, the set of observations, a subset of training observations for input to the encoder neural network system and a set of training target observations for training the system;

encoding each training observation using the encoder neural network system to provide an encoded observation for each training observation;

aggregating the encoded observations;

combining the aggregate of the encoded observations with respective training target image data for each training target observation in the set of training target observations to provide a set of combinations for decoding;

decoding each of the set of combinations using the decoder neural network system to provide a predicted classification of the training target image data; and training the encoder neural network system and the decoder neural network system with back propagation using a loss function dependent upon the predicted classifications for the set of training target observation and ground truth classifications for the set of training target observations.

13. The method of claim 11, further comprising:

generating, by the decoder neural network system, a predicted distribution for the predicted classification of the target image data; and determining the predicted classification of the target image data from the predicted distribution for the predicted classification of the target image data.

14. The method of claim 11, wherein the aggregated parameter is invariant under permutations of the set of observations.

15. The method of claim 11, wherein the combination received by the decoder neural network system further comprises a set of latent variables which together characterize the target image data.

16. The method of claim 15, further comprising determining parameters of a distribution of the set of latent variables, and sampling, by the decoder neural network system, from the distribution of the set of latent variables to provide the predicted classification of the target image data.

17. The method of claim 16, further comprising determining, by a prior neural network, the parameters of a prior distribution of the set of latent variables from the set of observations and determining, by a posterior neural network, the parameters of a posterior distribution of the set of latent variables from the target observation.

18. The method of claim 11, wherein the combination of the aggregated parameter and the target image data for the target observation comprises a concatenation of the aggregated parameter and the target image data.

19. A method for generating decoder output data values from input data values according to one or more learned data distributions, the method comprising:

receiving a target image data for a target observation;

combining the target image data with an aggregated parameter that is an aggregate of a plurality of encoded observations encoded via an encoder neural network from a set of training observations, each of the training observations comprising respective image data for a training observation and one or more respective classification for the training observation, the aggregating comprising applying a mean function to the encoded observations; and inputting the combination of the target image data and the aggregated parameter into a decoder neural network system to provide a predicted classification for the target image data.

20. The method of claim 19, further comprising, for each of a plurality of training steps:

receiving a training set of observations, each comprising image data for the observation and corresponding ground truth classification for the observation;

combining the aggregated parameter with each of the image data-from the training set of observations to provide a set of combinations for decoding;

decoding each of the set of combinations using the decoder neural network system to provide a set of predicted classifications for the image data from the training set of observations; and training the decoder neural network system with back propagation using a loss function dependent upon the set of predicted classifications and the ground truth classifications for the image data from the training set of observations.

* * * * *